Feb. 26, 1929.　　　H. C. SCHAPER　　　1,703,406

EVEN BALANCE SCALE

Filed April 7, 1927　　　6 Sheets-Sheet 1

Fig. 1

Inventor
Harry C. Schaper
By Cornwall, Bradly & James
Atty's.

Feb. 26, 1929.　　H. C. SCHAPER　　1,703,406

EVEN BALANCE SCALE

Filed April 7, 1927　　6 Sheets-Sheet 2

Inventor
Harry C. Schaper
By Cornwall, Bertell & Janne Att'ys

Feb. 26, 1929.  
H. C. SCHAPER  
1,703,406  
EVEN BALANCE SCALE  
Filed April 7, 1927  
6 Sheets-Sheet 3

Inventor  
Harry C. Schaper  
By Cornwall, Bedell & Janus  
Att'ys

Feb. 26, 1929.  H. C. SCHAPER  1,703,406
EVEN BALANCE SCALE
Filed April 7, 1927  6 Sheets-Sheet 5

Inventor
Harry C. Schaper
By Cornwall, Bidell & James
Atty's.

Patented Feb. 26, 1929.

1,703,406

UNITED STATES PATENT OFFICE.

HARRY C. SCHAPER, OF ST. LOUIS, MISSOURI, ASSIGNOR, BY MESNE ASSIGNMENTS, TO SCHAPER SCALE COMPANY, A CORPORATION OF MISSOURI.

EVEN-BALANCE SCALE.

Application filed April 7, 1927. Serial No. 181,748.

This invention relates to new and useful improvements in scales and more particularly to even balance indicating scales of the type disclosed in my copending application filed February 23, 1926, Serial No. 90,049, on which this invention is an improvement.

In the aforesaid application, the weight indicating member is mounted on a fulcrum member having bearings in fixed brackets and operatively connected to the platform supports which form the vertical sides of a parallelogram, the scale beam and the check rod forming the horizontal sides thereof.

The objects of the present invention are to eliminate the fixed fulcrum support for said indicating member and to provide a resilient operating connection between vertical sides of said parallelogram and said indicating member, said connection being yieldable when the balanced relation of the scale is disturbed, to permit the indicating member to be correspondingly displaced and indicate the extent of the displacement in cooperation with a fixed weight indicating chart, this resilient connection being adapted to bring said indicating member in zero position as soon as the equilibrium of the scale is restored.

Further objects of the invention are to provide a resistant yieldable element operatively connected with the scale beam and acting as a resistance to the load placed thereagainst for automatically controlling the movement of the indicator and restoring the equilibrium.

Other objects of the invention are to provide a resilient member bowed and fixed at its ends to the vertical sides of a scale parallelogram and carrying at its crown portion or apex an indicating element which cooperates with a fixed chart and is movable in conjunction with said resilient member, when said vertical sides are displaced, in an arc about an imaginary axis substantially corresponding to the axis of the bowed portion of said resilient member; the extent of the movement of said indicating member being in definite relation with the displacement or distortion of said resilient element whereby the operative movement of the scale can be ascertained by reading the weight indicia chart in correlation with said movable member.

Still other objects of the invention are to provide means for engaging each half of said resilient element independently of the other, thereby equalizing the tension of said resilient member and thus providing easily accessible means for bringing the indicator in neutral position.

Still other objects of the invention are to provide means having mounted thereon the indicating member and adapted to be clamped on and produce the necessary curvature in a flat spring, the deflected ends of which are adapted to be fixed, under tension, to and supported by the vertically movable member cooperating with the scale beam, whereby the movement of the beam out of balance is resisted by said spring, which latter has tendency to return the scale beam and the indicating member to neutral position as soon as equilibrium is restored.

Still further objects of the invention are to provide a novel resisting element cooperating with the scale beam and automatically controlling the indicating member to indicate the weighing movement; said resisting element being so arranged that no fixed fulcrum is necessary, the indicating member being carried by said resisting element and movable about an imaginary or floating axis, thereby eliminating friction incidental to fixed fulcrum and increasing the accuracy of the scale.

Additional objects of the invention are to provide a scale of the class described which will weigh accurately even under out of level condition, is simple in construction and operation, has a wide weighing range, is so constructed that a maximum magnification is obtained with minimum angular movement and friction.

With these and other objects in view, my invention consists in certain novel features of construction and arrangement of parts, hereinafter more fully described and claimed, and illustrated in the accompanying drawings, in which—

The scale hereindescribed and illustrated in the accompanying drawings is of the even balance type having a load receiving platform and a weight receiving platform which are maintained in balance. Weight indicating means is provided preferably comprising a stationary chart containing suitable weight indicia and an element operatively supported by and connected to said platforms and movable to indicate the extent of over or under weight in correlation with the movements of said platforms.

Referring by numerals to the accompanying drawings 10 indicates a base on which is supported a housing 11 which encloses a scale mechanism 12. Projecting upwardly from the top wall of housing 11 is an extension or tower 13 having a circular flange 14 at its lower end for attachment to said housing and provided in its upper end with oppositely disposed side openings 15 for rendering visible a chart 16, which is stationarily mounted within said extension. An indicator 17 which extends upwardly into said extension 13 through an opening 11a formed in the top wall of housing 11 is adapted to cooperate with said chart 16.

A main lever or scale beam 18 is arranged in the upper portion of housing 11 and is fulcrumed by means of downwardly presented knife edge bearings or pivots 19 which extend laterally from said beam and rest in V-shaped grooves formed in upper faces of blocks 20. The latter are carried by bearings 21 preferably formed integral with base 10 and projecting upwardly therefrom.

Beam 18 is preferably formed of rectangular shape having a pair of spaced side members or beams 18a connected at their ends by transverse end member 18b, and connected intermediate their ends by transverse members 18c. Thus beam 18 is formed in the shape of a unitary rectangular member having a central opening or clearance space 22 and end openings or clearing spaces 23. A pair of upwardly presented laterally projecting knife edge pivots 24 are arranged in beam 18 a definite distance on each side of fulcrums 19 and extend outwardly from side members 18a. These knife edge pivots 24 form pivotal points of suspension for platform supporting members 25 which latter are arranged transversely and extend under the respective end portions of beam member 18. Members 25 are supported on pivots 24 by means of blocks 26 which are secured to upwardly presented ends 25a of members 25 and are provided with downwardly presented V-shaped grooves for engaging the knife edges or pivots 24. Each member 25 is formed with a horizontally disposed bar 25b, preferably arranged equal distance and in alignment with the vertical planes of the pivotal points of engagement of members 24 and 26.

A bolt or pin 27 is seated in said bar 25b and extends upwardly a suitable distance. Each bar 25b supports a cylindrical member 28, the lower end of which has a threaded engagement with pin 27, while the upper end extends outwardly through opening 29 formed in the top wall of housing 11 and is provided with an annular flange 28a. A lock member 30 is screwed on the threaded upper end of pin 27 and bears against the upper end of a cylindrical member 28 and locks the latter in position.

A weight receiving platform 31 is provided with a depending circular flange 32 which when platform 31 is in position encloses an annular flange of member 28. A load receiving platform 33 rests on the upper end of the other member 28 and is provided with a depending circular flange 34 for enclosing the flanged end of said member 28. A screw 35 is screw-seated in each flange 28a and projects laterally therefrom through an opening 36 formed in the respective flange of each platform 31 and 33 and locks the corresponding platform in position on the respective member 28. Depending from each member 25 is an extension 37 to the lower end of which is pivotally connected as at 38 one end of a check rod 39. The fulcrum 40 of this check rod is located at a point below and in vertical plane with pivots 19 and beam 18. This check rod serves to maintain platforms 31 and 33 in horizontal position and eliminates swinging movements of members 25. Each member 25 has an arm or extension 41 which projects inwardly toward the transverse axis of the machine.

Beam 18, platform supports 25, and check rod 39 form a parallelogram mounted for angular movement at 19 and 40 with supports 25 forming the vertical side members of the parallelogram and movable in vertical planes. While members 25 in the present instance form supports for the platforms, it will be understood that the vertically movable elements or members 25 of the scale beam can be disposed independently of said platforms, in which case arms 41 would be carried by such elements 25 and would have no connections with the platforms. Such construction may be desirable in cases where the extent of the vertical movement of the platform does not coincide with the vertical movement necessary for the operation of the resisting element 42, in which case the point of connection of member 25 with beam 18 may be located inwardly or outwardly of platform 31, in accordance with required vertical movement necessary to operate the ends of said resisting element 42, which movement may be greater or smaller than that of the platform.

The resilient element 42, which in the present instance is in the shape of a flat spring, is bowed and has its deflected ends 43 fixed under tension to the respective ends of arms 41 by suitable attaching means 44. This means preferably comprises a plate 45 placed against one side of each end 43 and seated with said end 43 in a channel 41$^a$ formed in the end of each arm 41. A screw 46 passes through apertures formed in plate 45 and the end 43 is screw-seated in arm 41, thereby clamping the end 43 in position.

The apex or crown portion 42$^a$ of resilient element 42 has clamped thereon cooperating clamping pieces 46 and 47, the upper one of which, 46, has an upward central extension 48 to which is secured the lower end of indicator 17. The underside of the upper piece 46 is grooved as at 49 to receive the bowed portion 42$^a$ and is curved longitudinally to impart to said resilient member the required curvature. The lower piece 47 has its upper face convexed or curved upwardly to fit against the concave face of member 46 and is provided with a peripheral shoulder 50 which extends into groove 49 and clamps portion 42$^a$ therein. Members 46 and 47 are secured together by screws 51 which are disposed in lugs 46$^a$ and 47$^a$ arranged laterally on members 46 and 47, respectively.

Resilient element 42, being bent or bowed, the ends thereof are under tension, and exert equal pressure against the vertically movable members 25. As the latter occupy, when the scale is in equilibrium, positions whereby the ends of said resilient member are in the same horizontal plane and the spring pressure or tension is equalized, it will be seen that the movement of scale out of balance will be resisted by said resilient member which will tend to restore the scale in equilibrium.

When the scale is actuated or moved out of balance, the resisting element is distorted, causing the ends thereof to move in vertical planes in opposite directions. This imparts to the bowed portion an arcuate motion about its own axis. This motion is transmitted greatly magnified to the pointer of the indicating member, whereby the extent of the displacement or scale movement can be ascertained. In this manner, an operative mounting is provided for the indicating member for moving the latter in an arc relatively to a stationary chart and in accordance with a load actuated scale mechanism without the use of a fixed fulcrum for said indicating member. The friction incidental to fixed bearings, or pivots, is thus eliminated and the life of the scale is considerably extended, while the accuracy thereof remains unimpaired, as the mounting of the indicating member is not subjected to wear.

The lower piece 47 has a depending lug 47$^b$ in which is screw-seated the upper end of a rod 52. On the lower end of rod 52 is adjustably arranged a pendulum weight or counterbalance 54. A jamb nut 55 is provided to lock the rod in position in lug 47$^b$ and lock nuts 56 are used to prevent accidental movement of pendulum 54.

This weight 54 serves as a counterbalance for indicator 17 and such parts as are disposed above the axis of the bowed portion 42$^a$ and is of exactly the same weight so that it will not overbalance the same.

In order to permit easy adjustment of member 42 without the necessity of disassembling any part of the scale, auxiliary adjusting means 55 is provided which means can be regulated through opening 11$^a$ formed in housing 11. This adjusting means comprises a lever 57 pivotally mounted to each side of indicator 17 in lugs 58. The latter are preferably formed integral with upper piece 46 and project upwardly and outwardly therefrom. The lower end of each lever 57 terminates in an inwardly presented finger 57$^a$ which traverses an opening 60 formed in extension 46$^b$ and bears against the corresponding side portion of resilient member 42 a short distance below clamping pieces 46 and 47. The opposite end of each lever 57 terminates in a threaded tubular portion 57$^b$ in which is screw-seated a screw 61, the lower end of which is adapted to bear against the upper face of clamping piece 46. Thus by turning screw 61 in the proper direction, finger 59 is moved inwardly against the corresponding side portion of resilient member 42, thereby increasing the tension thereof. In order to prevent accidental movement of screw 61 a U-shaped flat spring 62 apertured at its ends is interposed between the upper end of tubular portion 57$^a$ and the head of screw 61, thereby exerting spring pressure against the latter and preventing accidental turning thereof.

Screws 61 which are disposed to each side of indicator 17 and are upwardly presented can be readily reached through the opening $11^a$ formed in housing 11 so that the tension of either side portion of resilient member 42 can be regulated to bring the indicator 17 in zero position.

A dashpot 63 is connected by a piston rod 64 at 65 to the scale and serves to dampen the movements of the scale.

In Figures 1 to 12 the scale is shown with tower 13 arranged longitudinally of the scale so that the weight indicating means can be read from either side of the scale.

Figure 1:
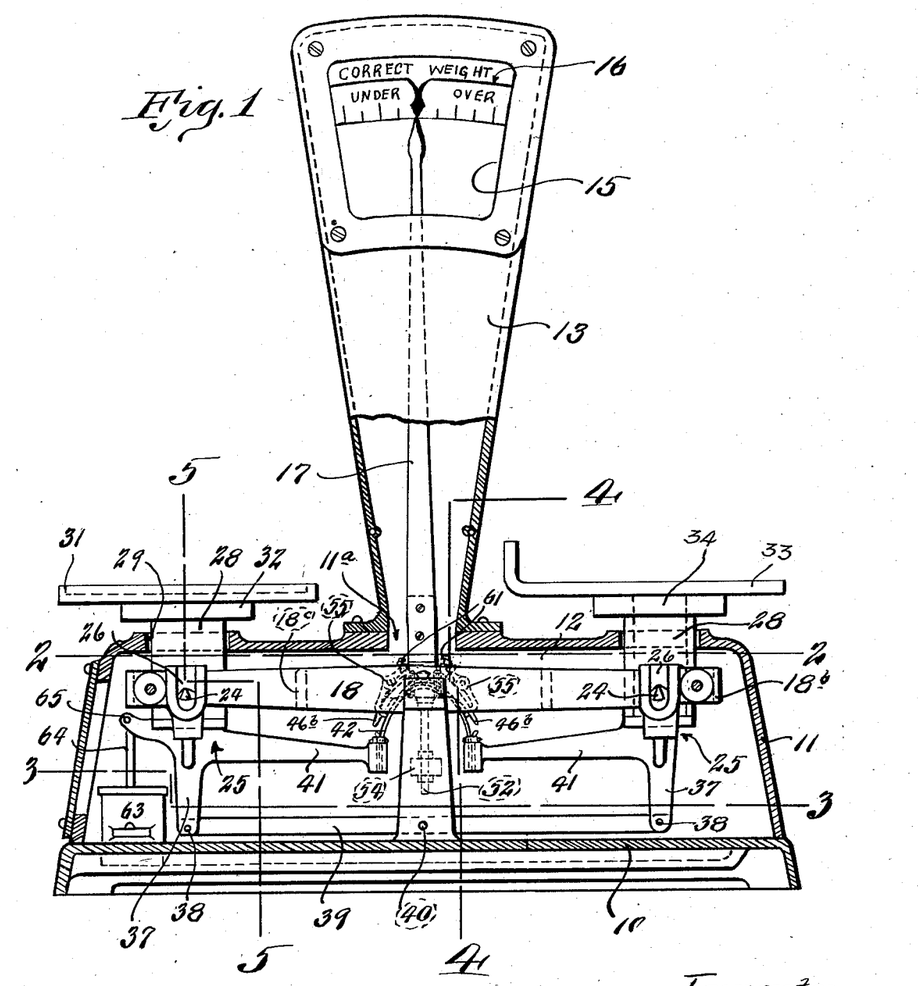
Figure 1 is a front elevational view of the scale with parts thereof in cross section to more clearly illustrate the invention.
Figure 2:
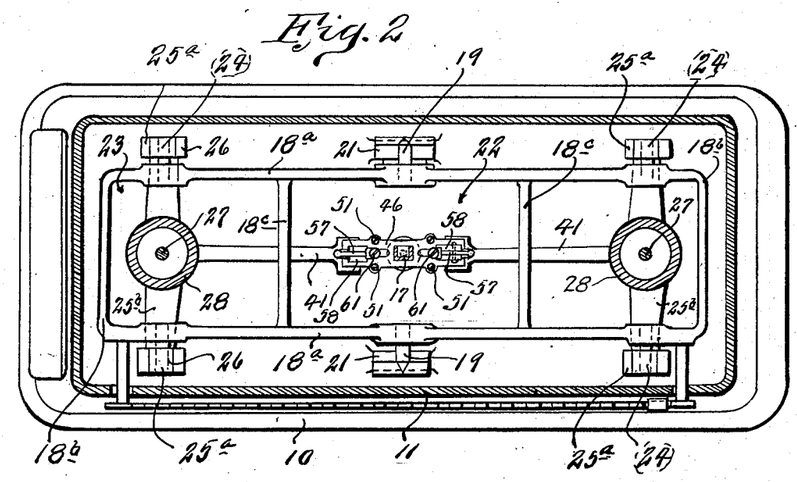
Figure 2 is a horizontal cross section taken on line 2—2 of Figure 1.
Figure 3:
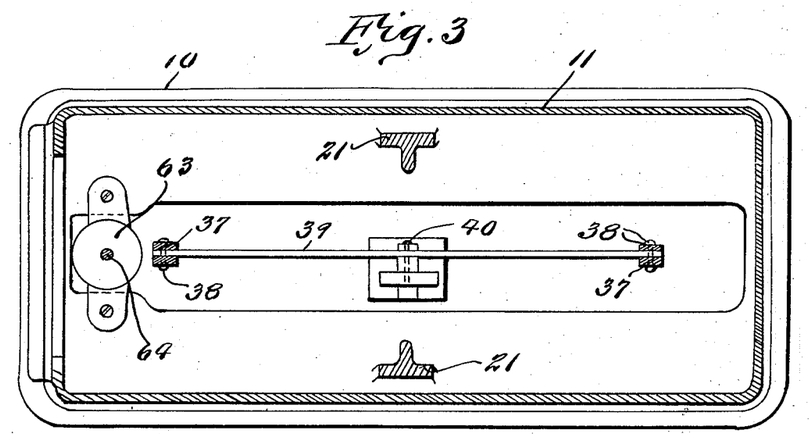
Figure 3 is a horizontal cross section taken on line 3—3 of Figure 1.
Figure 4:
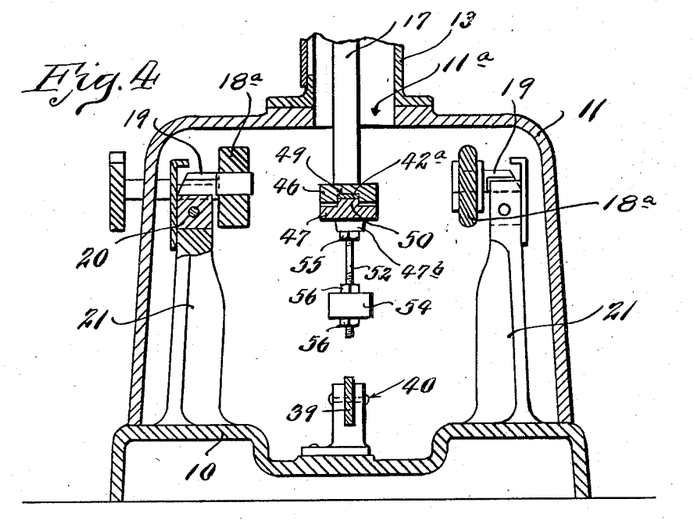
Figure 4 is an enlarged cross section taken on line 4—4 of Figure 1.
Figure 5:
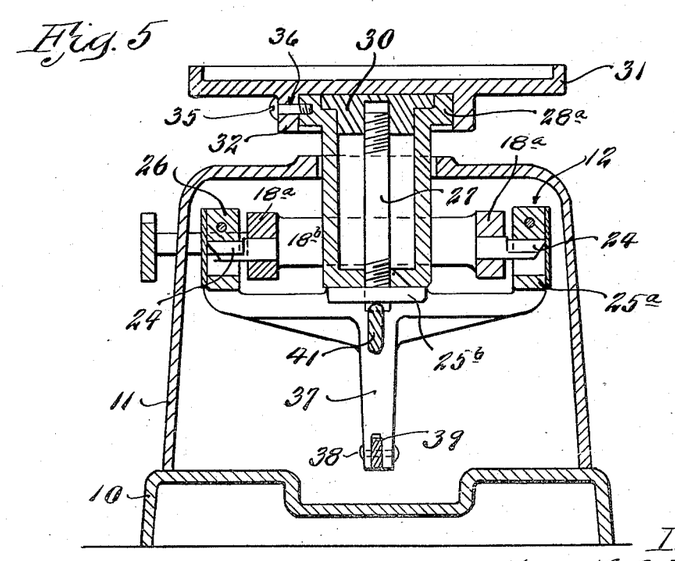
Figure 5 is an enlarged cross section taken on line 5—5 of Figure 1.
Figure 6:
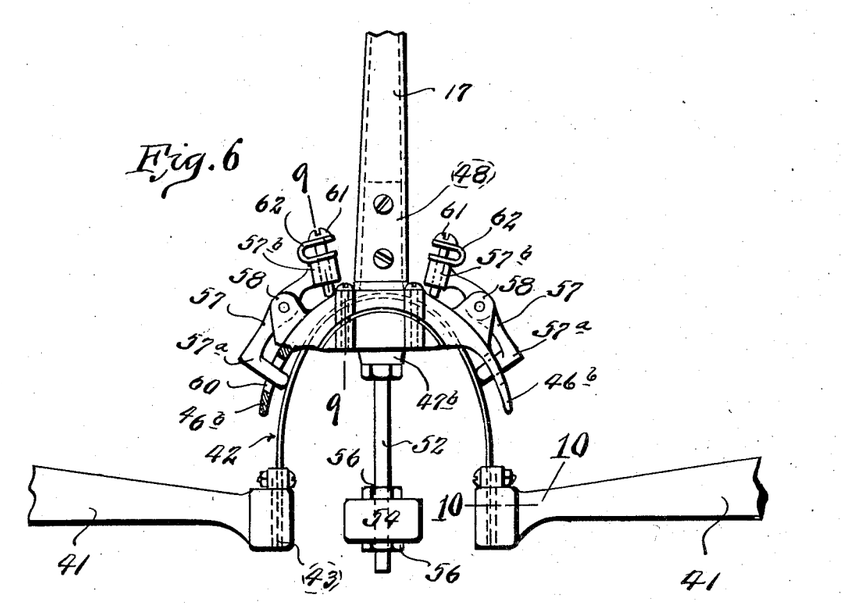
Figure 6 is a detail view of the resilient member and its connections.
Figures 7, 8, 9, 10:
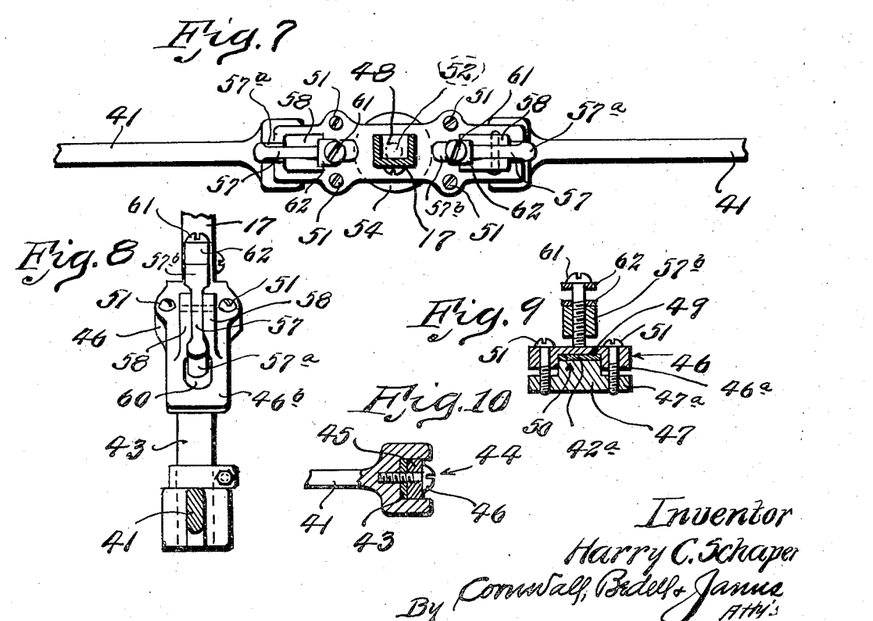
Figure 7 is a top plan view of same.
Figure 8 is an end elevational view of same.
Figure 9 is a transverse cross section taken on line 9—9 of Figure 6.
Figure 10 is a horizontal cross section taken on line 10—10 of Figure 6.
Figure 11:
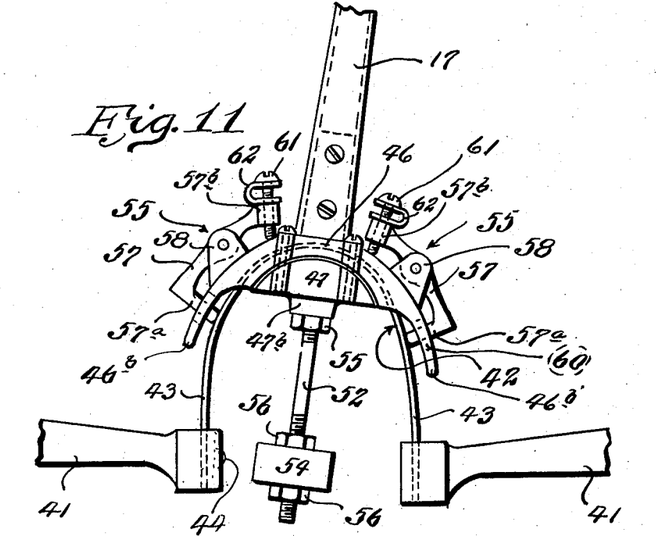
Figures 11 and 12 are detail views similar to Figure 6 but showing the mechanism moved in opposed directions.
Figure 12:
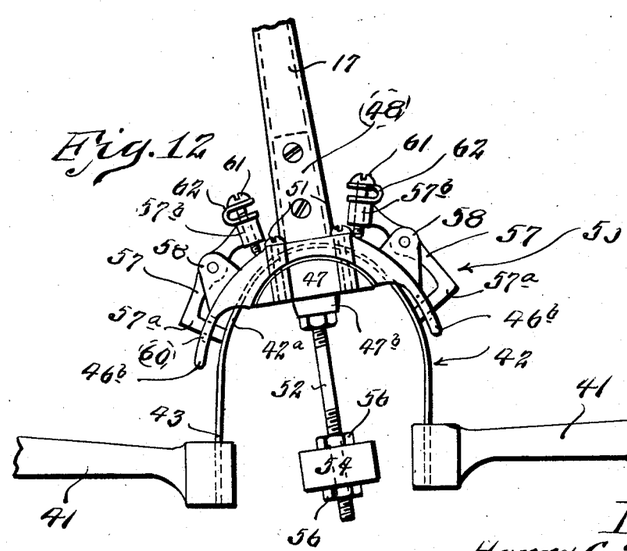
Figure 13:
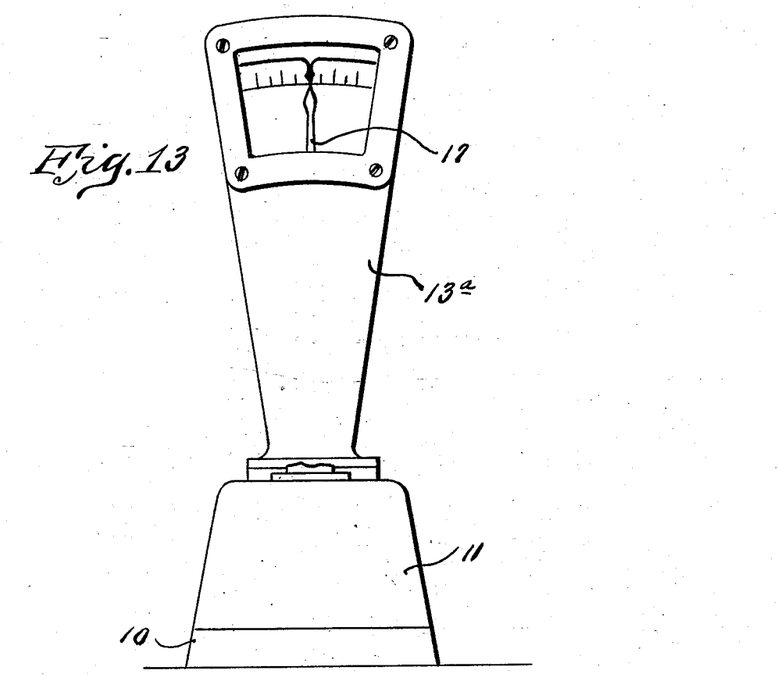
Figure 13 is an end elevational view of a modified form of my scale.
Figure 14:
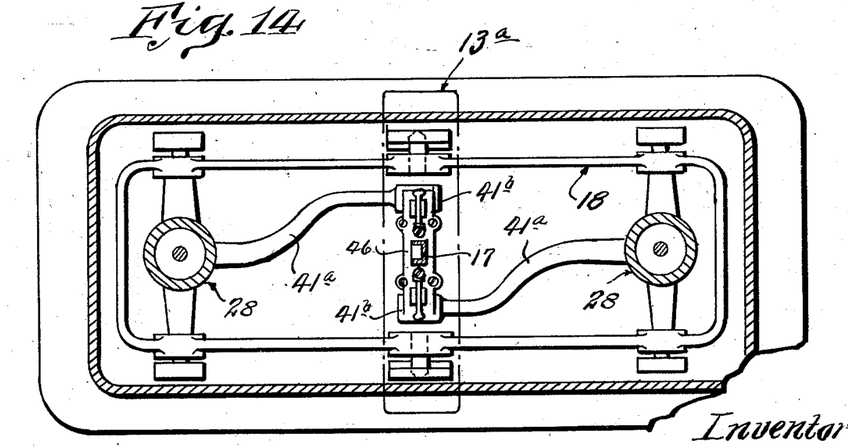
Figure 14 is a top plan view thereof with parts in cross section.

In the modified form shown in Figures $13$ and $14$ a tower $13^a$ is disposed transversely of the scale, whereby the weight indicating means may be read endwise. In this form the extensions or arms $41^a$ are offset relatively to each other and to the longitudinal axis of the scale and terminate oppositely to and in transverse alignment with each other. The resilient resisting element 42 is disposed transversely of the scale and has its ends connected in the usual manner to the ends $41^b$ of arms $41^a$. The construction and operation of the indicating means and parts carried by element 42 are the same as in the preceding form.

The particular construction and arrangement of the resisting resilient element 42 obviates the use of pivot supports for the indicator 17, thereby eliminating friction and inaccuracy produced by worn-out pivots and said element provides simple means for retaining the scale in equilibrium. This means is yieldable at the slightest disturbance of the equilibrium so that the operation of the scale is not impaired.

The counterbalance 54 equalizes the weight of the indicator 17 and the clamping means 46 and 47 but is not sufficient to overcome the tension of the resisting element 42. Consequently the tilting of the scale out of level does not affect the scale and the pointer will maintain its neutral position. Thus the scale may be used to weigh accurately even when occupying out of level position. The length of the indicator 17 can be arranged so as to provide proper magnification and the zone of travel thereof can be increased by lengthening the indicator while the travel of the beam remains unchanged. Thus maximum magnification is provided with the minimum amount of the travel of the beam.

A scale of my improved construction is very simple, is compact in size, has the necessary magnification to correctly indicate even small weighing movements, and its accuracy is not affected by occupying out of plum position.

While I have shown and described the preferred form of my invention, it will be obvious that various changes in the construction and arrangement of parts of my scale may be made and substituted for those herein shown and described, without departing from the spirit of my invention.

I claim:

1. An even balance indicating scale comprising a scale beam, vertically movable parallel members carried by said beam, a resilient tensioned element fixed at its ends to said members and carried thereby, and a weight indicating member operatively carried by said resilient element and extending outwardly therefrom.

2. An even balance indicating scale comprising a scale beam, vertically movable members actuated by said beam, a resilient bowed element fixed at its ends to said members and carried thereby, a weight indicating member carried by said resilient element and extending upwardly therefrom, and means for counterbalancing said resilient element and said indicator.

3. An even balance indicating scale comprising a scale beam, parallel members movable in vertical planes by said beam, a resilient element placed under tension with its ends fixed to said members whereby the relative movements of said members are resisted by said resilient element, and a weight indicator carried by said resilient element at a point substantially equidistant from the points of attachment of said element with said members and movable in accordance with the movement of said beam.

4. An even balance scale comprising a scale beam, vertically movable parallel members carried by said beam, a resilient bowed element fixed at its ends to said members and caried thereby, and a weight indicating member carried by said resilient member and extending outwardly therefrom.

5. A scale comprising a scale beam, platform supports carried by said beam, a resilient bowed member fixed at its ends to said supports, a weight indicator carried by and extending upwardly from said bowed member, and a pendulum weight for counterbalancing said weight indicating member.

6. A scale comprising a scale beam, platform supports carried by said beam, an upwardly bowed resilient member fixed at its ends to said supports, and a weight indicating member carried by the crown portion of said bowed member and extending outwardly therefrom.

7. A scale comprising a scale beam, platform supports carried by said beam, an upwardly bowed tensioned member disposed longitudinally of said beam and fixed at its ends to and carried by said supports, a weight indicating member fixed to and carried by the bowed portion of said bowed member and extending upwardly therefrom, and a pendulum carried by and depending from said crown portion for counterbalancing said weight indicating member.

8. An even balance scale comprising a scale beam, platform supports carried by said beam, a resilient member, clamping means having cooperating curved faces for clamping the central portion of said resilient member and distorting it to bend the ends thereof in the same direction, means for attaching said ends to said platform supports whereby said supports are held by said resilient member in equilibrium and adapted to distort said resilient member when out of balance, and a pointer fixed to said clamping means for indicating the weighing conditions of said platform supports.

9. An even balance indicating scale comprising a scale beam, vertically movable members carried by said beam, a resilient element, clamping means having cooperating curved faces for clamping the central portion of said resilient element and bowing it to turn the end portions thereof in the same direction, means for attaching the ends of said resilient element to said members at substantially the same horizontal plane whereby said element yieldably resists the movement of said members, and a weight indicating member fixed to said clamping means and movable in cooperation with said resilient element for indicating the weighing conditions of said scale beam.

10. An even balance scale comprising a scale beam, a pair of parallel members attached to the ends of said scale beam and movable in vertical planes thereby, a resilient element, clamping means having cooperating curved faces for clamping the central portion of said resilient element and bowing the latter to deflect the ends thereof in the same direction, means for securing said ends to said members whereby movement of said scale beam distorts said resilient member, and a weight indicating pointer carried by said clamping means.

11. A scale comprising a scale beam, a resilient bowed element coacting with said scale beam for retaining the latter in equilibrium, and a weight indicating member carried by the apex of said bowed member and movable in an arc about the axis of said bowed portion for indicating the neutral and weighing positions of said scale beam.

12. An even balance indicating scale comprising a scale beam, a resilient bowed member having its ends coacting with said scale beam and adapted to retain said scale beam in equilibrium, a stationary weight indicating chart, and an indicating member fixed to the bowed portion of said resilient member and movable therewith to indicate under and over weight in correlation with said chart and with said scale beam.

13. An even balance indicating scale comprising a scale beam, a resilient bowed member having its ends coacting with said scale beam and adapted to retain said scale beam in equilibrium, a stationary weight indicating chart, an indicating member fixed to the bowed portion of said resilient member and movable therewith to indicate under and over weight in correlation with said chart and with said scale beam, and a dashpot operatively connected to said scale beam for damping the action thereof.

14. In a scale, the combination with a scale beam, of a stationary chart provided with weight indicia, a yieldable resisting element having its ends movable in vertical planes in accordance with the movement of said beam, and an indicating member cooperating with said chart and carried by the central portion of said element and movable therewith in accordance with the movement of said beam.

15. In an even balance indicating scale, the combination with a scale beam, of a stationary chart having over and under weight indicia, a bowed resisting element having its ends movable in vertical planes and coacting with said scale beam, and an indicating member carried by the bowed portion of said resisting element and movable therewith in accordance with the movement of said beam for indicating in cooperation with said chart the weighing conditions of said scale.

16. In an even balance indicating scale, a resilient element bowed to place it under tension and having its ends adapted to be fixed to oppositely and vertically movable parts of said scale for retaining the latter in equilibrium.

17. A scale, a resilient element bowed to place it under tension and having its ends adapted to be fixed to oppositely and vertically movable parts of said scale whereby said element retains said scale in equilibrium, and a weight indicating member carried by the bowed portion of said resilient element for indicating the weighing conditions of said scale.

18. In an even balance scale for indicating over and under weight, a stationary chart provided with over and under weight indicia, a spring member bowed and disposed in a vertical plane and having its ends adapted to be fixed to vertically movable parts of said scale whereby the tension of said element retains said scale in equilibrium, and a pointer carried by the bowed portion of said element and cooperating with said chart.

19. A scale, the combination with a scale beam, of a resilient bowed element having its ends adapted to be movable in vertical planes in cooperation with said scale beam, and a weight indicating pointer carried by said element and movable thereby in accordance with the movement of said scale beam.

20. A scale, the combination with a scale beam including parts associated therewith and movable in vertical planes, of a resilient bowed element having its ends fixed to said parts whereby said scale beam is retained in equilibrium by the tension of said element, and a weight indicating pointer fixed to the bowed portion of said element and movable therewith in accordance with the movement of said scale beam.

21. A scale, the combination with a scale beam including parts associated therewith and movable in vertical planes, of a resilient bowed element having its ends fixed to said parts whereby said scale beam is retained in equilibrium by the tension of said element, a weight indicating pointer fixed to the bowed portion of said element and movable therewith in accordance with the movement of said scale beam, and a dashpot associated with said scale beam for retarding the movement thereof.

22. In a scale, a resisting element comprising a spring member adapted to be bowed and have its ends secured to vertically and oppositely movable parts of a scale, whereby the movement of the scale out of equilibrium is resisted by said element.

23. In a scale, a resisting element comprising a spring member adapted to be bowed and have its ends secured to vertically and oppositely movable parts of said scale whereby the bowed portion of said spring member is movable about its own axis, and a weight indicating member fixed to the crown of said bowed portion and movable therewith to indicate the extent of movement of said scale.

24. In an even balance scale for indicating under and over weight, a resilient spring element bowed and adapted to have its ends secured under tension to vertically and oppositely movable parts of a scale, whereby the movement of the scale out of balance is resisted by said spring element, and a pointer carried by said spring element and movable therewith to indicate under and over weight movements of said scale.

25. In an even balance scale for indicating under and over weight, a resilient spring element bowed and adapted to have its ends secured under tension to vertically and oppositely movable parts of a scale, whereby the movement of the scale out of balance is resisted by said spring element, a pointer carried by said spring element and movable therewith to indicate under and over weight movements of said scale, and means for counterbalancing said bowed element and said indicator.

26. In an even balance scale for indicating over and under weight, the combination with a scale beam and a pointer for indicating under and over weight, of a resisting element bowed to place it under tension and having its ends fixed to parts of said scale movable in vertical planes in opposite directions in cooperation with said scale beam, said bowed member being adapted to have said pointer secured thereto for controlling the indicating movements thereof.

27. In an even balance indicating scale, the combination with a weight receiving member and a load carrying member, of a beam supporting said members and actuated thereby, and a bowed resilient member having its ends cooperating with the opposite ends of said beam for resisting the movement of said beam out of balance, and a weight indicating member fixed to and carried by said bowed member and movable therewith to indicate the weighing movements of said beam.

28. In an even balance indicating scale, the combination with a scale beam, of a load carrying member and a weight receiving member carried by said beam, a resisting bowed element having its ends cooperating with said beam and exerting spring pressure thereagainst for maintaining the latter in equilibrium, and a dashpot cooperating with said scale beam for retarding the movements thereof.

29. In an even balance indicating scale, the combination with a scale beam, of a pair of members disposed on the opposite sides of the fulcrum of said beam and operable thereby in vertical planes in opposite directions, a resilient element bowed and having its ends fixed to said members whereby the tension of said bowed member tends to maintain said beam in equilibrium, and a pointer carried by said bowed member for indicating the weighing movements of said beam.

30. In an even balance indicating scale, the combination with a scale beam, of a pair of members disposed on the opposite sides of said beam and operable thereby in vertical planes in opposite directions, a resilient element bowed and having its ends fixed to said members whereby the tension of said bowed member tends to maintain said beam in equilibrium, a pointer carried by said bowed member for indicating the weighing movements of said beam, and a dashpot operatively associated with said beam.

31. In an even balance indicating scale, the combination with a scale beam, of a pair of members operatively connected to the opposite sides of the fulcrum of said beam and movable in vertical planes in opposite directions, each of said members being provided with a rigid extension projecting toward the fulcrum of said beam, a resilient member bowed and having its ends connected to the respective extensions of said parallel members whereby the tension of said resilient member tends to maintain said beam in equilibrium and the movement of said beam distorts the tension of said bowed member, a fixed weight indicia chart, and a pointer movable coaxially with the bowed portion of said resilient member for cooperating with said fixed chart and indicating the weighing movement of said beam.

32. In a scale, indicating mechanism comprising a stationary indicating member, a resilient bowed element having its ends adapted to have fixed to parallel oppositely movable members of a scale for maintaining the latter in equilibrium, and an indicating member carried by said bowed element and movable therewith in accordance with the actuation of said movable members, the last mentioned indicating member cooperating with said stationary indicating member.

33. In a scale, indicating mechanism comprising a stationary indicating member, a resilient bowed element having its ends adapted to be fixed to parallel oppositely movable members of a scale for maintaining the latter in equilibrium, an indicating member carried by said bowed element and movable therewith in accordance with the actuation of said movable members, the last mentioned indicating member cooperating with said stationary indicating member, and an equalizing means for counterbalancing said bowed element and said movable indicating member whereby said indicating mechanism occupies neutral position regardless of the out of level condition of the scale.

34. In an even balance indicating scale, indicating mechanism comprising a resilient bowed element adapted to be fixed at its ends to spaced vertically movable members of a scale, a weight indicating member fixed to and movable with said bowed element about the axis thereof, said resilient element being displaceable in accordance with the load placed on said scale and adapted to return said scale in neutral position, when balance is restored, and means attached to said element for counterbalancing the latter and said indicating member and maintaining them in neutral positions.

35. In a scale, a resilient bowed element having end portions movable by a scale part in opposite parallel directions, and an indicator cooperating with the crown portion of said element and movable in correlation therewith about an axis defined by said element.

36. In a scale, the combination with a movable part of a scale, of a resilient element having an intermediate bowed portion and having end portions movable by said scale part in opposite parallel directions, and an indicator carried by the intermediate portion of said resisting element and movable thereby about an axis established by said intermediate portion.

37. In a scale, the combination with a movable part thereof, of a resilient bowed member operatively associated with said scale part, and an indicator cooperating with said resilient member and having an oscillatory movement about a predetermined axis without having a fulcrum mounting.

38. In a scale, the combination with a scale mechanism, of a bowed resilient element having its ends movable by said scale mechanism in opposite directions to produce an arcuate movement of the crown portion of said element, and an indicator fixed to said crown portion and movable therewith about a predetermined axis.

39. In a scale, the combination with a scale mechanism, of a resilient resisting element having an intermediate bowed portion and having its terminals movable by said scale mechanism in opposed parallel directions, and an indicator carried by said element and movable in an arc about the axis of said bowed portion.

40. In a scale, a resilient member having its ends adapted to be actuated in opposed parallel directions by a scale beam, clamping means having cooperating curved surfaces for clamping the central portion of said resilient member and imparting thereto a curve of predetermined radius, and an indicator fixed to said clamping means and operable by said resisting element about the axis of said central portion.

In testimony whereof I hereunto affix my signature this 26th day of March, 1927.

HARRY C. SCHAPER.

CERTIFICATE OF CORRECTION.

Patent No. 1,703,406.   Granted February 26, 1929, to

HARRY C. SCHAPER.

It is hereby certified that error appears in the printed specification of the above numbered patent requiring correction as follows: Page 5, line 106, claim 17, and line 126, claim 19, for the words "A scale" read "In a scale"; page 6, line 3, claim 20, and line 13, claim 21, for the words "A scale" read In a scale"; and that the said Letters Patent should be read with these corrections therein that the same may conform to the record of the case in the Patent Office.

Signed and sealed this 26th day of March, A. D. 1929.

(Seal)

M. J. Moore,
Acting Commissioner of Patents.